A. KIKTA.
WRENCH.
APPLICATION FILED MAR. 21, 1921.

1,389,515.

Patented Aug. 30, 1921.

Inventor
A. Kikta.

By
Geo. P. Kimmel.
Attorney

UNITED STATES PATENT OFFICE.

ALEX KIKTA, OF FLINT, MICHIGAN.

WRENCH.

1,389,515.  Specification of Letters Patent.  Patented Aug. 30, 1921.

Application filed March 21, 1921. Serial No. 454,115.

*To all whom it may concern:*

Be it known that I, ALEX KIKTA, a citizen of the United States, residing at Flint, in the county of Genesee and State of Michigan, have invented certain new and useful Improvements in a Wrench, of which the following is a specification.

This invention relates to wrenches and more particularly to devices for unscrewing and screwing up jar closures, pipes and the like.

The object of the invention is to provide a simple and efficient device of this character which has a flexible object-encircling gripping member capable of securely engaging the object and which may be readily adjusted to fit objects of various dimensions.

With these and other objects in view the invention consists of such novel features of construction as hereinafter shown and described and then specifically pointed out in the claim, and in the drawings illustrative of the preferred embodiment of the invention.

In the accompanying drawings:—

Figure 1:
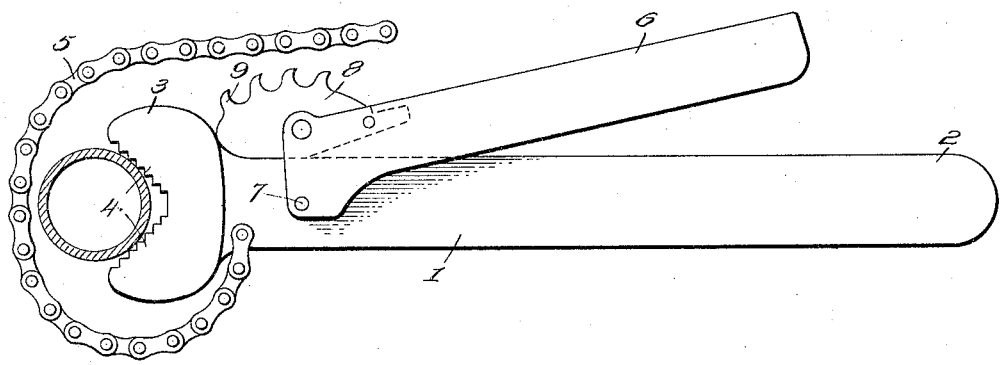
Figure 1 represents a side elevation of a wrench constructed in accordance with this invention with the parts shown in open position.

In the embodiment illustrated a body member 1 is shown constructed of any suitable metal and provided at one end with a hand grip 2 and at its other end with an enlarged head 3 equipped with a substantially V-shaped serrated object engaging jaw 4.

A flexible object encircling member 5 is secured at one end to the member 1 at one side and adjacent to the head thereof and is preferably constructed of a chain similar to that of a bicycle chain, the links at the free end of the element 5 being adapted for adjustable engagement with a rack to be described.

A lever 6 inverted U-shape in cross section straddles one edge of the member 1 and is fulcrumed at one end to said member adjacent the head 3 thereof as shown at 7 and carries at its inner end a rack 8 provided on one side with a plurality of longitudinally spaced hook-like teeth 9 to adjustably engage the links of the free end of the gripping chain 5 to adapt said chain to fit objects of different sizes, the inner edge of said rack being in the form of a cam to pull the chain taut when the lever is pulled. The free end of the lever 6 is designed to shut down over the edge of the member 1 and to be grasped with the hand grip 2 of said member when operating the wrench.

The chain 5 is of length to provide for the formation of a loop between the ends thereof which is designed to encircle the object which is to be gripped such as a jar closure, a pipe or the like.

Figure 2:
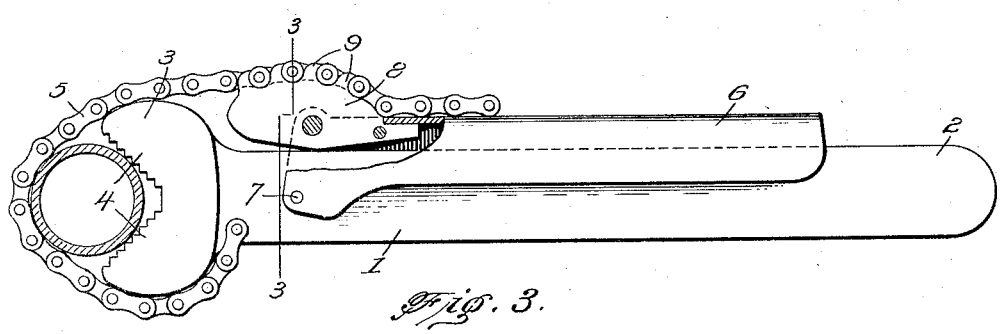
Fig. 2 is a similar view with the parts in closed position.
Figure 3:
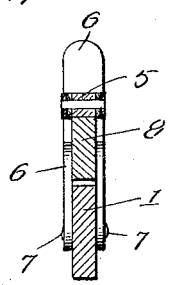
Fig. 3 is a transverse section taken on the line 3—3 of Fig. 2.

In the use of this device the lever 6 is swung into the open position shown in Fig. 1 and the chain 5 passed around the pipe, jar closure, or other object to be operated on and one of the links at the free end of said chain engaged with one of the teeth 9 of the rack 8. After this loop has been positioned over the object to be gripped the lever 6 is swung into the closed position shown in Fig. 2 which will operate to draw the chain 5 tightly around the closure or pipe and firmly grip it. The operator by grasping the free end of the lever 6 with the hand grip 2 of the member 1 may then turn the wrench in the desired direction for turning the object gripped by the chain 5.

When the loop formed by the chain 5 is passed around the jar closure or other object the serrated fixed jaw 4 engages one side of said object and the teeth thereof operate to hold it against slipping on the closure or other object gripped.

The preferred embodiment of the invention is disclosed in the drawings and set forth in the specification, but it will be understood that any modifications within the scope of the claim may be made in the construction without departing from the principle of the invention or sacrificing any of its advantages.

What is claimed is:—

A wrench of the class described comprising an elongated body member provided at one end with a hand grip and at its other end with an enlarged head equipped with a forwardly and longitudinally opening V-shaped, serrated, object engaging jaw, a lever inverted U-shape in cross section straddling one edge of said body member and fulcrumed at one end to said member adjacent said head, a rack secured to the front end of said lever with the outer edge of said rack curved longitudinally and provided with a plurality of longitudinally spaced hook-like teeth, said rack having a cam like inner edge to engage the edge of said body member when the lever is swung into closed position, and an object encircling chain pivotally secured at one end to said body member adjacent the head thereof on which said lever is mounted, said chain being adapted to extend around the object to be gripped and to be engaged with said rack, whereby the closing of the lever will operate to pull the chain taut and force the object encircled thereby into biting engagement with the jaw of the body member.

In witness whereof, I affix my signature hereto.

ALEX KIKTA.